United States Patent
Chang et al.

(10) Patent No.: US 12,277,289 B2
(45) Date of Patent: Apr. 15, 2025

(54) TOUCH MODULE AND TOUCH SCREEN USING SAME

(71) Applicant: eGalax_eMPIA Technology Inc., Taipei (TW)

(72) Inventors: Chin-Fu Chang, Taipei (TW); Shang-Tai Yeh, Taipei (TW); Cheng-Han Lee, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/336,441

(22) Filed: Jun. 16, 2023

(65) Prior Publication Data

US 2024/0353956 A1    Oct. 24, 2024

(30) Foreign Application Priority Data

Apr. 21, 2023 (TW) .................................. 112115002

(51) Int. Cl.
*G06F 3/041* (2006.01)

(52) U.S. Cl.
CPC .......... *G06F 3/0418* (2013.01); *G06F 3/0412* (2013.01); *G06F 3/04164* (2019.05)

(58) Field of Classification Search
CPC .......... G06F 1/18; G06F 1/1658; G06F 3/047; G06F 1/1643; G06F 3/04164; H05K 7/06; H01R 43/00; H04M 1/0274; H04M 1/0266; H04M 2250/22; Y10T 29/49169

See application file for complete search history.

(56) References Cited

U.S. PATENT DOCUMENTS

| | | | | |
|---|---|---|---|---|
| 6,636,037 | B1 * | 10/2003 | Ou-Yang | G01N 27/902 324/234 |
| 12,124,661 | B2 * | 10/2024 | Zeng | G09G 3/32 |
| 2013/0120052 | A1 * | 5/2013 | Siska | G01R 27/2605 327/517 |
| 2013/0321304 | A1 * | 12/2013 | Wang | G06F 3/041 200/305 |
| 2014/0051298 | A1 * | 2/2014 | Wang | H01R 24/62 439/626 |
| 2014/0071081 | A1 * | 3/2014 | Shedletsky | G06F 1/18 361/767 |
| 2016/0004110 | A1 * | 1/2016 | Imai | G02F 1/1341 156/291 |
| 2017/0331230 | A1 * | 11/2017 | Bayer | H01R 13/629 |

(Continued)

*Primary Examiner* — Shaheda A Abdin
(74) *Attorney, Agent, or Firm* — MUNCY, GEISSLER, OLDS & LOWE. P.C.

(57) ABSTRACT

The present invention relates to a touch module and a touch screen. The touch module includes a touch panel located on the display module, a main circuit board located outside the casing of the touch screen, a plurality of signal cables connecting the touch panel and the main circuit board, and an equal potential wiring. By setting an equal potential wiring in the touch module to electrically bridge any two signal cables, a short circuit is formed between the shielding layers of the signal cables so that the potentials of different signal cables can be equalized to make the signal cables roughly the same degree of electrostatic or electromagnetic interference from the environment. By making the signals obtained by the signal cables be disturbed to approximately the same degree, the touch module can accurately determine the touch position.

10 Claims, 12 Drawing Sheets

(56) References Cited

U.S. PATENT DOCUMENTS

| 2019/0220115 A1* | 7/2019 | Mori | G06F 3/0446 |
| 2021/0165526 A1* | 6/2021 | Fan | G06F 3/044 |
| 2022/0057910 A1* | 2/2022 | Xiong | H05K 1/147 |
| 2022/0229530 A1* | 7/2022 | Liu | H05K 1/028 |

* cited by examiner

TOUCH MODULE AND TOUCH SCREEN USING SAME

This application claims the priority benefit of Taiwan patent application number 112115002, filed on Apr. 21, 2023.

BACKGROUND OF THE INVENTION

1. Field of the Invention

The present invention provides a touch module and a touch screen, especially a cable assembly for the touch module.

2. Description of the Related Art

Capacitive touch modules are widely used in electronic products, such as smart phones, tablet computers and electronic whiteboards, which can be used to sense the contact position of conductive objects such as fingers. Capacitive touch module is not only susceptible to noise interference in the environment, but also its own design may cause the sensing error of the touch position.

FIG. 1 is a side sectional view of a conventional touch screen, wherein the bottom side of the touch screen 1 has a metal casing 10, and a display module 11 arranged in the metal casing 10, the touch module 12 has a touch panel 121 arranged on the display module 11. With reference to FIG. 2, it is a bottom view of the conventional touch screen. The touch module 12 also has a main circuit board 122 installed on the back of the metal casing 10, and a plurality of flexible cables 123 electrically connected between the main circuit board 122 and the touch panel 121. Each cable 123 has a plurality of lines inside, and these lines are respectively directly or indirectly connected to a plurality of electrodes of the touch panel 121. The main circuit board 122 can transmit driving signals to the touch panel 121 through the cables 123, or can obtain sensing signals from the touch panel 121 through the cables 123.

However, due to the different lengths of the cables 123, the interference degree of the static electricity or electromagnetic interference in the touch screen 1 such as the power supply, the transformer or the environment on the cables 123 is also different, so that the degree of interference of the signals obtained through the cables 123 is also different. Various static electricity and electromagnetic waves with different strengths cause differences in the potentials stored inside each cable 123, and cause troubles in judging the real touch position.

SUMMARY OF THE INVENTION

Therefore, in view of the above problems, the inventor collected relevant information, and after various evaluations and considerations, he designed this touch module and touch screen.

It is the main object of the present invention to provide a touch module for a touch screen comprising a casing and a display module inside the casing. The touch module comprises a touch panel located on the display module, a main circuit board located outside the casing, a plurality of signal cables connecting the touch panel and the main circuit board, each the signal cable comprising a plurality of wire cores arranged in parallel and a shielding layer surrounding and covering at least a part of the wire cores, and an equal potential wiring used to electrically bridge the shielding layers of any two the signal cables to form a short circuit between these the shielding layers. By setting the equal potential wiring in the touch module to electrically connect any two signal cables, a short circuit is formed between the shielding layers so that the potentials of two different signal cables can be equalized to make the two signal cables roughly the same degree of electrostatic or electromagnetic interference from the environment. By making the signals obtained by these signal cables be disturbed to approximately the same degree, the touch module can accurately determine the touch position.

It is another object of the present invention to provide a touch module for a touch screen, wherein each signal cable further comprises at least one short-circuit line electrically connected to each the shielding layer and arranged in the same direction as the wire cores, and the equal potential wiring is electrically connected to each shielding layer via the at least one short-circuit line.

It is still another object of the present invention to provide a touch module for a touch screen, wherein each short-circuit lines is set on the edge of each signal cables or the main circuit board.

It is still another object of the present invention to provide a touch module for a touch screen, wherein the main circuit board is a printed circuit board, and the equal potential wiring is a circuit printed on the printed circuit board.

It is still another object of the present invention to provide a touch module for a touch screen, which further comprises an intermediary circuit board, wherein the equal potential wiring is set on the intermediary circuit board, the intermediary circuit board is composed of a printed circuit board, and the equal potential wiring is a circuit printed on the printed circuit board.

DETAILED DESCRIPTION OF THE PREFERRED EMBODIMENT

In order to achieve the above-mentioned purpose and effect, the technical means and structure adopted by the present invention are hereby drawn to describe in detail the features and functions of the preferred embodiments of the present invention as follows, so as to facilitate a complete understanding.

Figure 1:
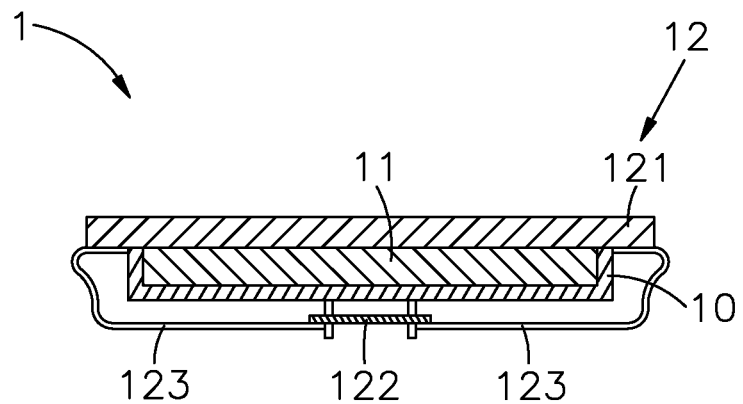
FIG. 1 is a side sectional view of a conventional touch screen.
Figure 2:
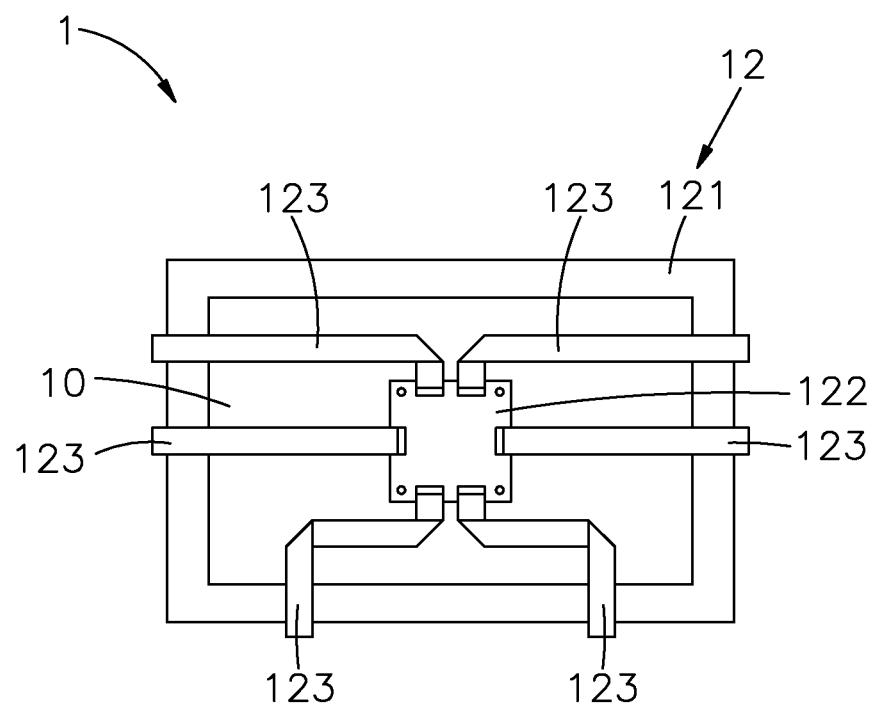
FIG. 2 is a bottom view of the conventional touch screen.
Figure 3:
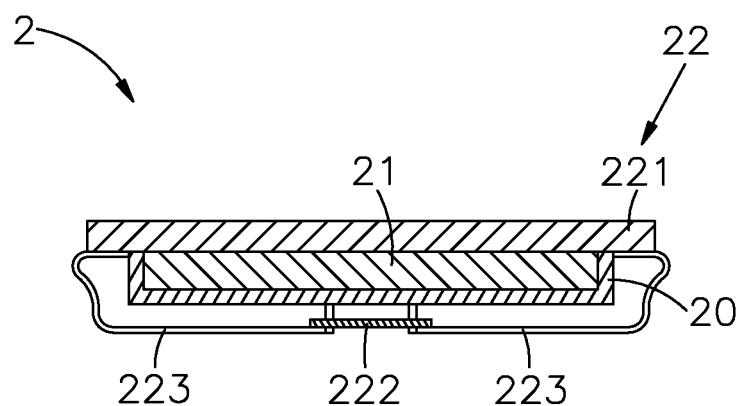
FIG. 3 is a side sectional view of the first embodiment of the touch screen of the present invention.
Figure 4:
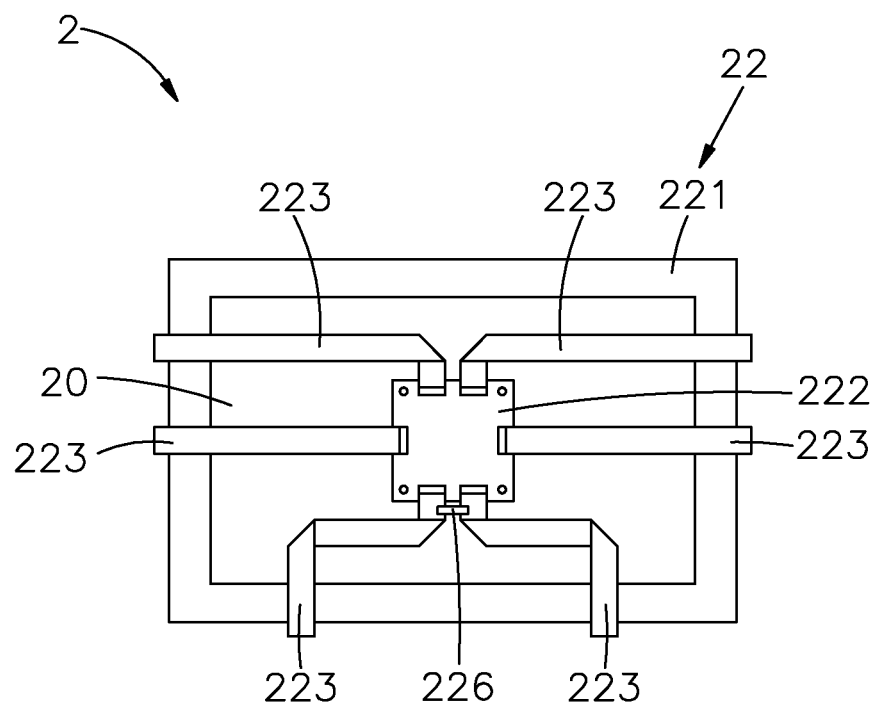
FIG. 4 is a bottom view of the first embodiment of the touch screen of the present invention.
Figure 5:
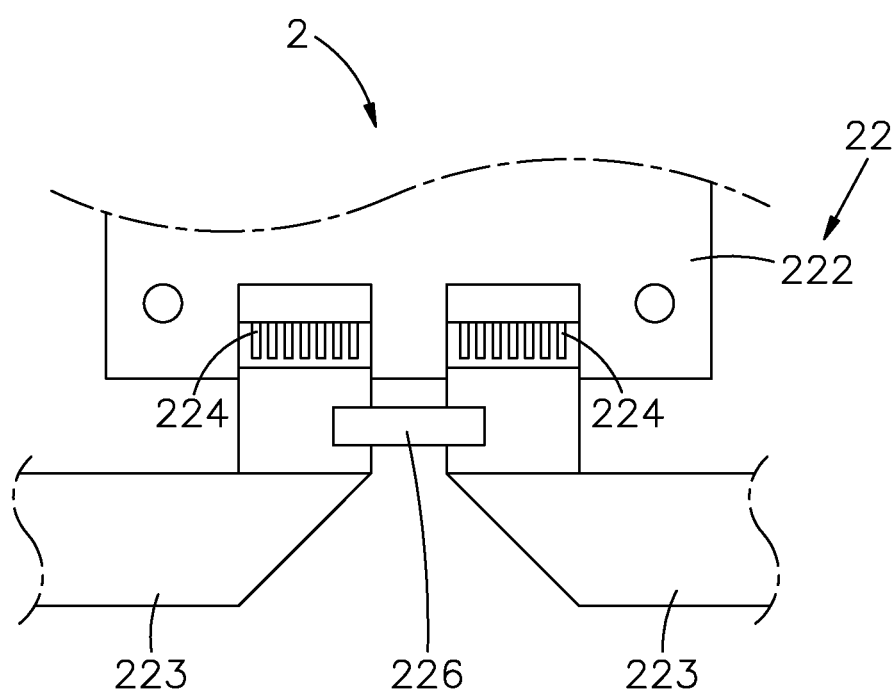
FIG. 5 is a partially enlarged view of FIG. 4 of the present invention.
Figure 6:
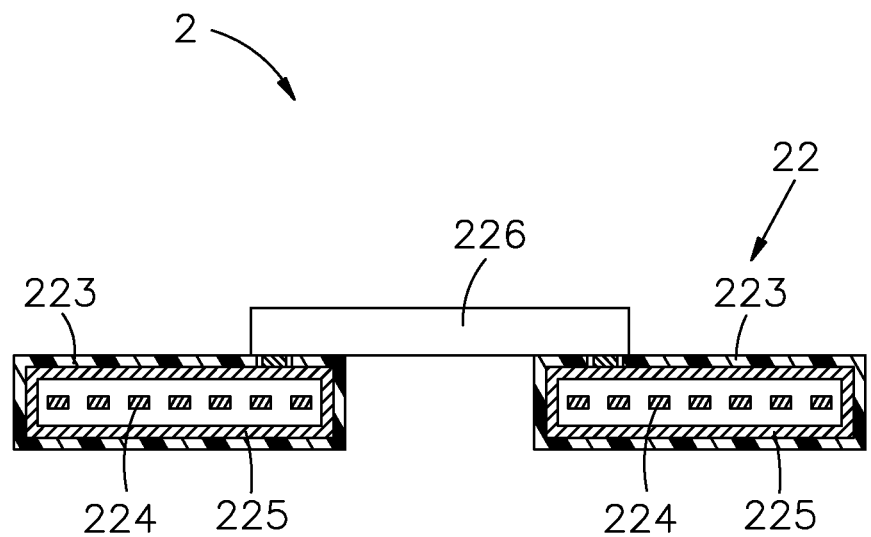
FIG. 6 is a side sectional view of the signal cables and the equal potential wiring in FIG. 5 of the present invention.

Please refer to FIGS. 3 and 4, which are side sectional view and bottom view of the first embodiment of the touch screen of the present invention. The touch screen 2 comprises a casing 20, a display module 21 disposed inside the casing 20, and a touch module 22. The touch module 22 comprises a touch panel 221 located on the display module 21, a main circuit board 222 located outside the casing 20, and a plurality of signal cables 223 connecting the touch panel 221 and the main circuit board 222. The main circuit board 222 can transmit the driving signal to the touch panel 221 through the signal cables 223, or can obtain the sensing signal of the touch panel 221 through the signal cables 223. Referring to FIGS. 5 and 6 at the same time, each signal cable 223 comprises a plurality of wire cores 224 arranged in parallel to transmit electronic signals inside, and a shielding layer 225 surrounding and covering at least a part of the wire cores 224. In addition, the touch module 22 further comprises an equal potential wiring 226 used to electrically bridge the shielding layers 225 of any two signal cables 223, so that these shielding layers 225 form a short circuit state.

By electrically bridge any two signal cables 223 with the equal potential wiring 226, a short circuit is formed between the shielding layers 225, so that the potentials of two different signal cables 223 can be equalized to make the two signal cables 223 roughly the same degree of electrostatic or electromagnetic interference from the environment. By making the signals obtained by these signal cables 223 be disturbed to approximately the same degree, the touch module 22 can accurately determine the touch position. It should be noted that these signal cables 223 cannot be directly connected to the ground of the touch screen 2. Since the touch signal is easily affected by external factors such as power fluctuations, the slight potential drift of the ground will cause the signal-to-noise ratio of the touch signal to decrease. If these signal cables 223 are used to obtain the sensing signals of the touch panel, the impact on the signal-to-noise ratio is more obvious.

Figure 7:
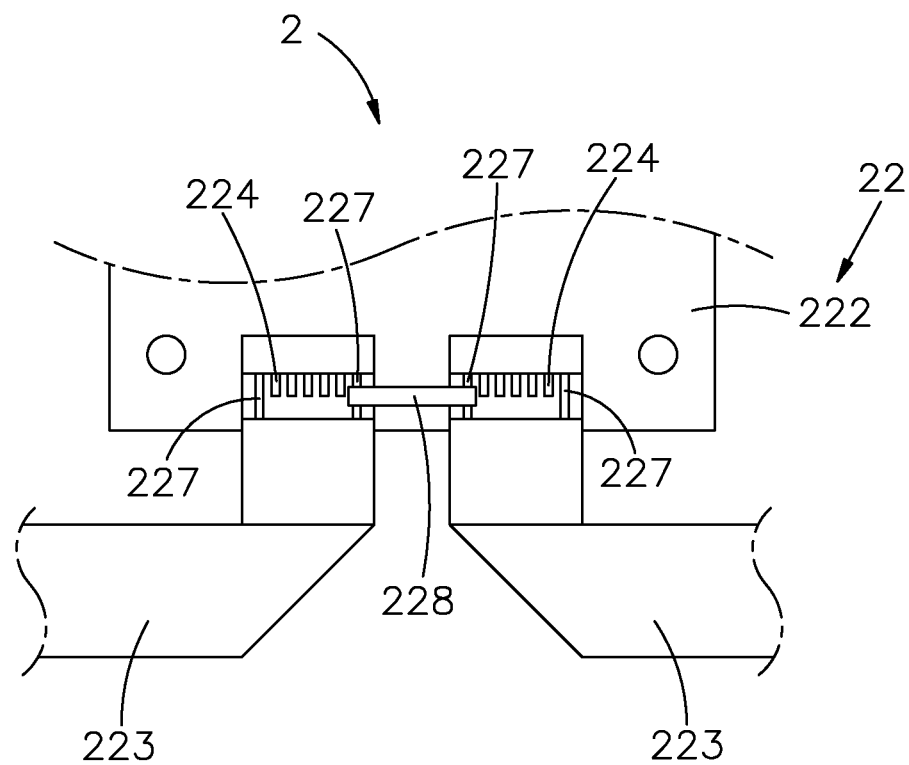
FIG. 7 is a bottom view of the second embodiment of the touch screen of the present invention.
Figure 8:
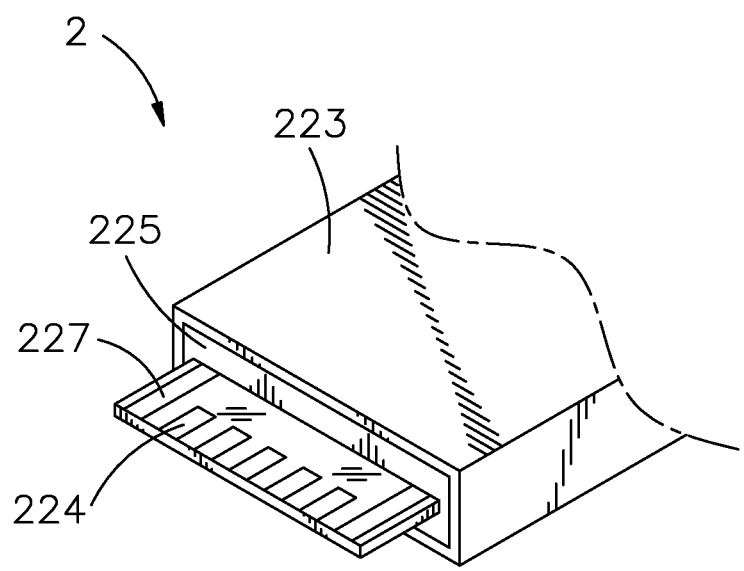
FIG. 8 is an elevational view of the second embodiment of the touch screen of the present invention.

As shown in FIG. 7 and FIG. 8, it is a bottom view and a perspective view of the second embodiment of the touch screen of the present invention. In this embodiment, the touch screen 2 is substantially the same as the touch screen 2 of the first embodiment, the difference is that each signal cable 223 further comprises two short-circuit lines 227 electrically connected to the respective shielding layer 225. The short-circuit lines 227 and the wire cores 224 are arranged in the same direction, and the short-circuit lines 227 are arranged on both sides of the signal cable 223. The equal potential wiring 228 is electrically bridge the short-circuit lines 227 exposed at the front end of the signal cables 223, and is electrically connected to the shielding layers 225 through the short-circuit lines 227.

Figure 9:
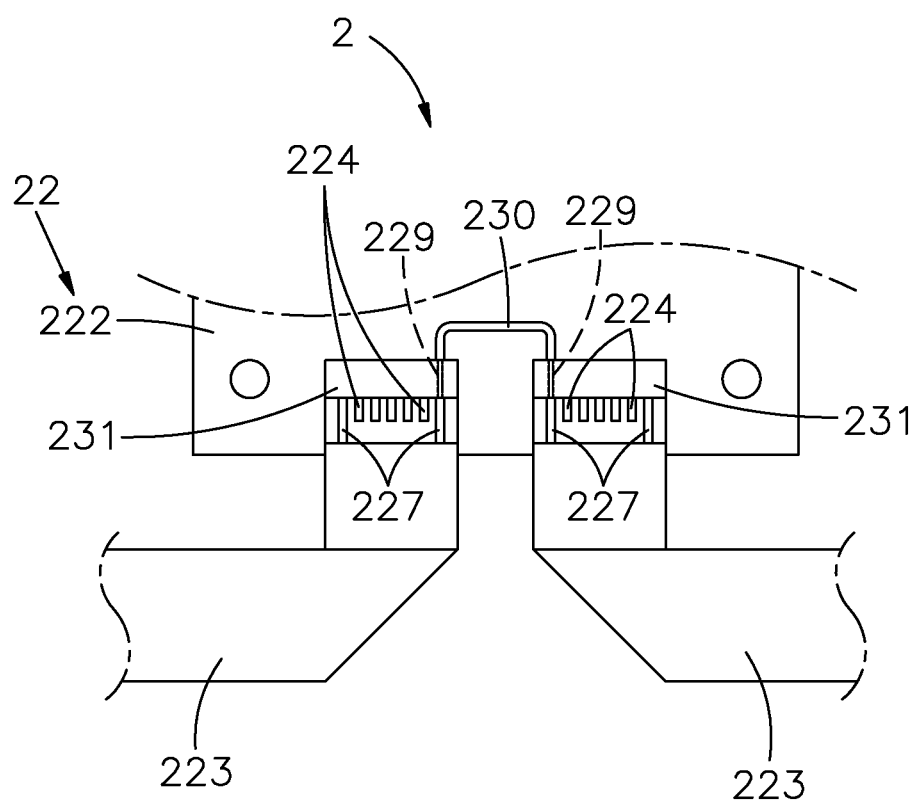
FIG. 9 is a bottom view of the third embodiment of the touch screen of the present invention.
Figure 10:
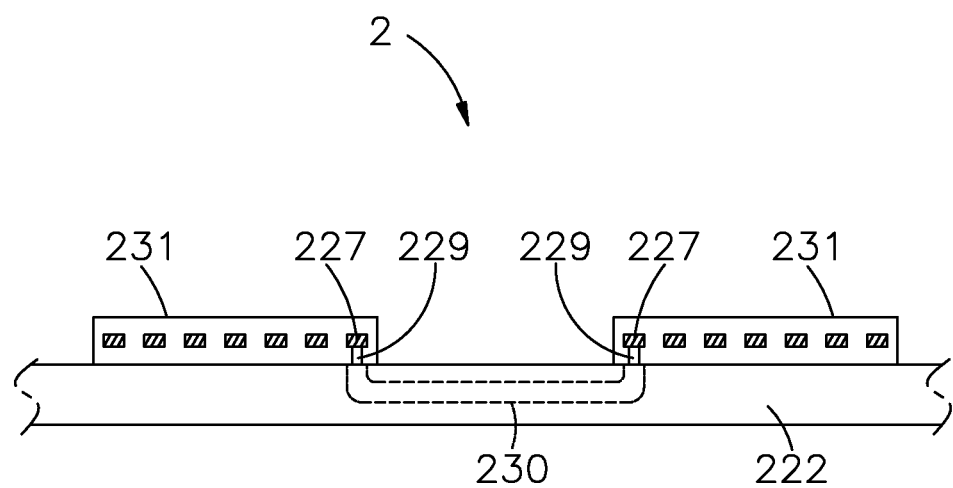
FIG. 10 is a side sectional view of the third embodiment of the touch screen of the present invention.

As shown in FIG. 9 and FIG. 10, it is a bottom view and a side sectional view of the third embodiment of the touch screen of the present invention. In this embodiment, the touch screen 2 is substantially the same as the touch screen 2 of the second embodiment, the difference is that the equal potential wiring 230 is set on the main circuit board 222. Preferably, the main circuit board 222 is a printed circuit board (PCB), and the equal potential wiring 230 is a circuit printed on the printed circuit board. The short-circuit lines 227 of each signal cable 223 are connected to the equal potential wiring 230 through the metal terminals 229 in the connector 231 of the main circuit board 222.

Figure 11:
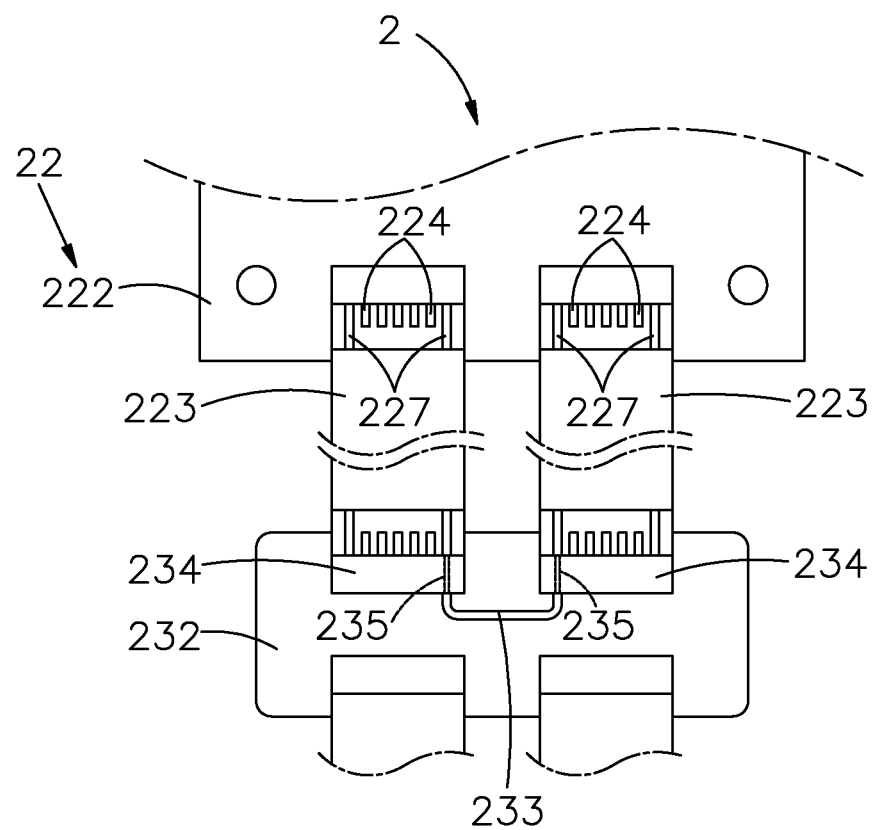
FIG. 11 is a bottom view of the fourth embodiment of the touch screen of the present invention.
Figure 12:
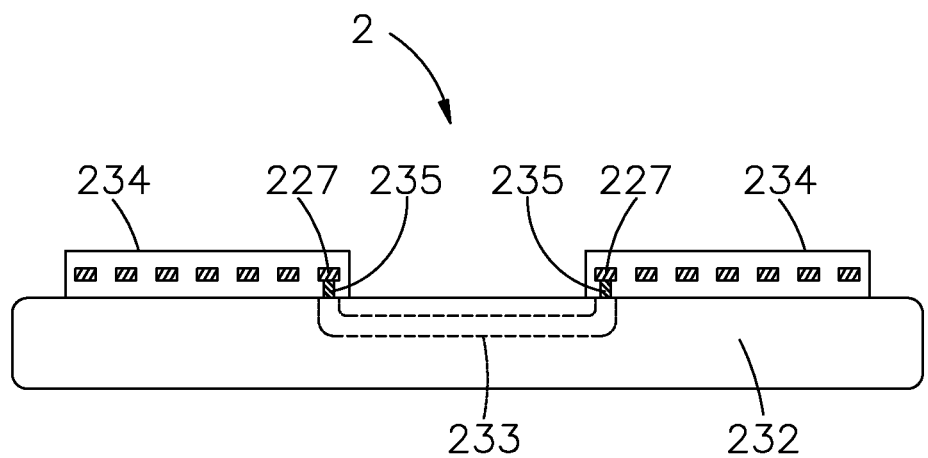
FIG. 12 is a side sectional view of the fourth embodiment of the touch screen of the present invention.

As shown in FIG. 11 and FIG. 12, it is a bottom view and a side sectional view of the fourth embodiment of the touch screen of the present invention. In this embodiment, the touch screen 2 is substantially the same as the touch screen 2 of the second embodiment, the difference is that the touch module 22 further comprises an intermediary circuit board 232 (meaning an expansion circuit board), and the equal potential wiring 233 is disposed on the intermediary circuit board 232. Preferably, the intermediary circuit board 232 is composed of a printed circuit board, and the equal potential wiring 233 is a circuit printed on the printed circuit board. The short-circuit lines 227 of each signal cable 223 are connected to the equal potential wiring 233 via the metal terminals 235 in the connector 234 of the intermediary circuit board 232.

In the above-mentioned embodiments, the connection between the signal cables 223 and the main circuit board 222, whether it includes a wire end connector or does not include a wire end connector, all are possible embodiments of the present invention. If it is the signal cables 223 that include the wire end connector, it only needs to be connected with the power distribution connector of the main circuit board 222, then the signal cables 223 and the main circuit board 222 can be electrically connected. If it is the signal cables 223 that do not include the wire end connector, it is necessary to pierce the outer skin of the signal cables 223 through the electrical connector (such as: 231, 234) installed on the main circuit board 222 by rotation, so that the conductive terminals (not shown) in the electrical connector and the wire cores 224 in the signal cables 223 form an electrical connection.

In each of the above embodiments, after the touch screen 2 is turned off, the connection section formed by the shielding layers 225 of the signal cables 223 and the equal potential wiring (226, 228, 230, 233) can also further use a switch (not shown, which can be an electronic active switch composed of a MOSFET, or a mechanical switch of normally open (NO) or normally closed (NC), the present invention does not make any limitation). The specific method is to give the trigger signal to the gate (G) through software or firmware, so that the line connected from the source(S) to the drain (D) is turned on. The static electricity accumulated after the use of the touch screen 2 is guided to the grounding area (for example: the ground plane or ground loop of the main circuit board 222 or intermediary circuit board 232, or the metal casing of the electronic product embedded with the touch screen 2) through software, firmware or hardware control methods, so that the touch screen 2 can maintain a state close to zero potential (0V) for its multiple signal cables 223, shielding layer 225 and equal potential wiring (226, 228, 230, 233) every time it is restarted and used, and the touch signal during use will not be easily affected by external electromagnetic interference or power fluctuations.

It can be understood that the equal potential wiring 230 on the main circuit board 222 disclosed in FIGS. 9 and 10 in each embodiment is based on the equal potential wiring 230 connected between adjacent cables as the main implementation state, which does not affect the embodiment of the present invention that more shielding layers 225 inside the signal cables 223 form a common connection. The present invention can connect more than two signal cables 223 and shielding layers 225 at the same time to achieve equipotential characteristics. In each of the above-mentioned embodiments, the form of directly laying out lines on the main circuit board 222 (or called: circuit board) is the best use state (as FIGS. 9 and 10). This method of direct circuit layout on the main circuit board 222 can directly form a common connection section of multiple signal cables 223 and shielding layer 225 with multiple signal cables 223 in the welding process or the docking of the connector. This method can effectively reduce components, simplify the manufacturing process and avoid additional processing operations, and can maintain the stability of the overall use.

The main feature of the present invention is that an equal potential wiring (226, 228, 230, 233) is provided in the touch module 22 to electrically bridge any two signal cables 223, so that a short circuit is formed between these shielding layers 225, and two different signal cables can be connected. The potentials of the cables 223 form an equipotential, so that the two signal cables 223 are roughly the same degree of electrostatic or electromagnetic interference from the environment. Moreover, the signals obtained by these signal cables 223 are interfered to the same extent, so that the touch module 22 can accurately determine the touch position. The present invention is applied to electronic products embedded with touch screens, and has excellent practicability, so a patent application is filed to seek patent protection.

Above-mentioned is only preferred embodiments of the present invention, and does not limit the patent scope of the present invention therefore, Therefore, all simple modifications and equivalent structural changes made by using the contents of the description and drawings of the present invention should be included in the patent scope of the present invention in the same way.

To sum up, the above-mentioned touch module and touch screen of the present invention can really achieve its effect and purpose when used, so the present invention is an invention with excellent practicability. In order to meet the application requirements for invention patents, please file an application in accordance with the law. I hope that the review committee will approve this case as soon as possible to protect the hard work of the inventor. If the review committee has any doubts, please feel free to send a letter. The inventor will do his best to cooperate.

What the invention claimed is:

1. A touch module for a touch screen, said touch screen comprising a casing and a display module inside said casing, said touch module comprising:
    a touch panel located on said display module;
    a main circuit board located outside said casing;
    a plurality of signal cables connecting said touch panel and said main circuit board, each said signal cable comprising a plurality of wire cores arranged in parallel and a shielding layer surrounding and covering at least a part of said wire cores; and
    an equal potential wiring used to electrically bridge the shielding layers of any two said signal cables to form a short circuit between these said shielding layers,
    wherein each said signal cable further comprises at least one short-circuit line electrically connected to each said shielding layer and arranged in a same direction as said wire cores; said equal potential wiring is electrically connected to each said shielding layer via said at least one short-circuit line, and
    wherein each said short-circuit lines is set on an edge of each of said signal cables.

2. The touch module as claimed in claim 1, wherein said equal potential wiring is set on a main circuit board.

3. The touch module as claimed in claim 2, wherein said main circuit board is a printed circuit board, and said equal potential wiring is a circuit printed on said printed circuit board.

4. The touch module as claimed in claim 1, further comprising an intermediary circuit board, wherein said equal potential wiring is set on said intermediary circuit board.

5. The touch module as claimed in claim 4, wherein said intermediary circuit board is a printed circuit board, and said equal potential wiring is a circuit printed on said printed circuit board.

6. A touch screen comprising:
    a casing;
    a display module located inside said casing;
    a touch module comprising a touch panel on said display module, a main circuit board on the outside of said casing and a plurality of signal cables connecting said touch panel and said main circuit board, each said signal cable comprising a plurality of wire cores arranged in parallel and a shielding layer surrounding and covering at least a part of said wire cores; and
    an equal potential wiring used to electrically bridge said shielding layers of any two said signal cables to form a short circuit between these said shielding layers,
    wherein each said signal cable further comprises at least one short-circuit line electrically connected to each said shielding layer and arranged in a same direction as said wire cores; said equal potential wiring is electrically connected to each said shielding layer via said at least one short-circuit line, and
    wherein each said short-circuit line is set on an edge of both sides of each said signal cable.

7. The touch screen as claimed in claim 6, wherein said equal potential wiring is set on a main circuit board.

8. The touch screen as claimed in claim 7, wherein said main circuit board is a printed circuit board, and said equal potential wiring is a circuit printed on said printed circuit board.

9. The touch screen as claimed in claim 6, further comprising an intermediary circuit board, wherein said equal potential wiring is set on said intermediary circuit board.

10. The touch screen as claimed in claim 9, wherein said intermediary circuit board is composed of a printed circuit board, and said equal potential wiring is a circuit printed on said printed circuit board.

* * * * *